United States Patent
Schultz et al.

(10) Patent No.: US 8,561,644 B2
(45) Date of Patent: Oct. 22, 2013

(54) PULSATOR APPARATUS AND METHOD OF OPERATION

(75) Inventors: Nicholas E. Schultz, Verona, WI (US); Gary C. Steingraber, Madison, WI (US); Leon Cramer, Clinton (CA)

(73) Assignee: Technologies Holdings Corp., Houston, TX (US)

( * ) Notice: Subject to any disclaimer, the term of this patent is extended or adjusted under 35 U.S.C. 154(b) by 367 days.

(21) Appl. No.: 12/771,143

(22) Filed: Apr. 30, 2010

(65) Prior Publication Data

US 2011/0266476 A1   Nov. 3, 2011

(51) Int. Cl.
    *F16K 51/00*  (2006.01)
(52) U.S. Cl.
    USPC ............. 137/625.65; 137/596.17; 137/315.03
(58) Field of Classification Search
    USPC ................. 137/625.26, 597, 601.01, 601.14, 137/599.11, 315.09, 315.27, 315.28, 137/315.03, 596–596.2, 613, 884, 625.65, 137/625.27; 119/14.39, 14.42
    See application file for complete search history.

(56) References Cited

U.S. PATENT DOCUMENTS

| | | | | |
|---|---|---|---|---|
| 2,832,314 A | * | 4/1958 | Cyphers | 119/14.38 |
| 3,073,345 A | * | 1/1963 | Hagler | 137/625.65 |
| 3,255,776 A | * | 6/1966 | Noorlander | 324/628 |
| 4,128,110 A | * | 12/1978 | Haytayan | 137/454.2 |
| 4,450,864 A | | 5/1984 | Huckebrink | 137/624.13 |
| 4,531,547 A | * | 7/1985 | Hadden | 137/625.64 |
| 5,207,177 A | * | 5/1993 | Lidman | 119/14.28 |
| 5,454,399 A | * | 10/1995 | Kazakis et al. | 137/596.16 |
| 5,535,783 A | * | 7/1996 | Asou et al. | 137/625.65 |
| 5,697,325 A | * | 12/1997 | Gehm et al. | 119/14.28 |
| 6,273,122 B1 | * | 8/2001 | Schudt et al. | 137/315.03 |

FOREIGN PATENT DOCUMENTS

| | | | | |
|---|---|---|---|---|
| EP | 1 731 026 A1 | 12/2006 | | A01J 5/12 |
| EP | 1731026 A1 | * 12/2006 | | |
| RO | 103731 | 8/1993 | | A01J 5/14 |

OTHER PUBLICATIONS

*PCT Notification of Transmittal of the International Search Report and the Written Opinion of the International Searching Authority* for International Application No. PCT/US2011/034536; 11 pages, Jul. 22, 2011.

* cited by examiner

*Primary Examiner* — Stephen M Hepperle
*Assistant Examiner* — Angelisa Hicks
(74) *Attorney, Agent, or Firm* — Baker Botts L.L.P.

(57) ABSTRACT

A pulsator comprises a valve chamber and an armature arranged in the valve chamber. An electrically powered coil at least partially surrounds the valve chamber and generates a magnetic flux. A magnetic pole piece is arranged in the valve chamber and has a metal surface. The armature has a first end nearest the magnetic pole piece and a second end. The first end of the armature has a metal surface and the second end has a first sealing surface and a second sealing surface.

18 Claims, 5 Drawing Sheets

PULSATOR APPARATUS AND METHOD OF OPERATION

TECHNICAL FIELD OF THE INVENTION

This invention relates generally to electromechanical devices, and more particularly to a pulsator apparatus.

BACKGROUND OF THE INVENTION

Current pulsator designs used in the milking industry include an armature with a rubber seal located at each of its ends. This reduces magnetic efficiency of the solenoid assembly because the rubber creates a larger gap between the metal of the pole piece and the metal of the armature assembly. Essentially, the rubber reduces the magnetic attraction between the metals of these two components. This reduction in magnetic efficiency creates a need for more electrical current to be used in order to actuate the armature. More electrical current being used means more total energy being consumed. Thus, this is a less energy efficient design.

SUMMARY OF THE INVENTION

In one embodiment, a pulsator comprises a valve chamber and an armature arranged in the valve chamber. An electrically powered coil at least partially surrounds the valve chamber and generates a magnetic flux. A magnetic pole piece is arranged in the valve chamber and has a metal surface. The armature has a first end nearest the magnetic pole piece and a second end. The first end of the armature has a metal surface and the second end has a first sealing surface and a second sealing surface.

In another embodiment, a three-port valve is used to apply alternately atmospheric pressure from a first port and vacuum pressure from a second port to a third port. The valve comprises a magnetic pole piece and an armature with a first end near the pole piece and first and second sealing surfaces located near a second, opposite, end of the armature. An electrically powered coil generates a magnetic flux that causes a magnetic attraction between the pole piece and the armature.

Various embodiments of the invention may have none, some, or all of the following advantages. Technical advantages of this pulsator embodiment include a more energy efficient design and operation. For example, by arranging a first and second sealing surface at the second end of the armature, the gap between the metal surface of the pole piece and the metal surface of the armature is reduced. This creates a more efficient metal-to-metal surface area relationship between the pole piece and the armature. As a result, the magnetic flux needed to attract the armature to the pole piece is reduced. Thus, the pulsator of this embodiment uses less electricity than other types of pulsators. Other advantages will be readily apparent to one skilled in the art from the description and the appended claims.

BRIEF DESCRIPTION OF THE DRAWINGS

For a more complete understanding of the present invention and its advantages, reference is now made to the following description taken in conjunction with the accompanying drawings, in which.

DETAILED DESCRIPTION OF THE DRAWINGS

Figure 1:
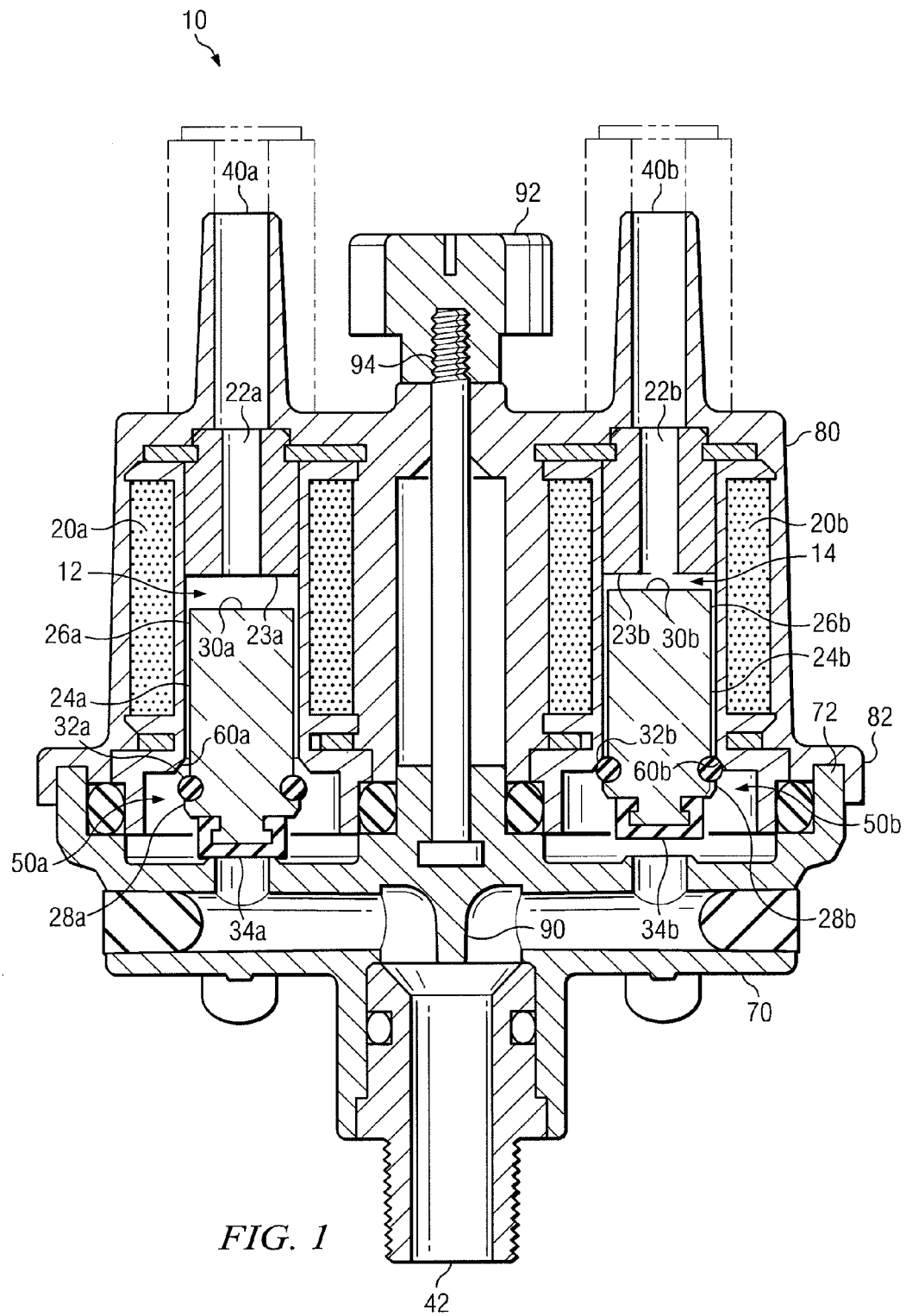
FIG. 1 illustrates a cutaway view of a pulsator according to one embodiment.

FIG. 1 illustrates a cutaway view of one embodiment of a pulsator 10. In one embodiment, pulsator 10 includes a first valve chamber 12 and a second valve chamber 14. In other embodiments, pulsator 10 comprises a single valve chamber 12. Each of first and second valve chambers 12 and 14 include various common components which shall be referred to according to a common reference numeral followed by the sub reference (a) for components associated with first valve chamber 12, and sub reference (b) for components associated with second valve chamber 14.

In general, pulsator 10 may be used in a milking system. For example, pulsator 10 is coupled to a milking apparatus that includes up to four teat cup liners. As described in greater detail below, pulsator 10 alternates between applying vacuum pressure to the outside of the teat cup liners via air tubes so that milk may be drawn out of a cow, or any other appropriate animal, and atmospheric air pressure to massage the teats. Once the milk is drawn out from the cow, it can be passed to reservoir tanks, using various parts of a milking system known to those of skill in the art. The present pulsator 10 described herein achieves certain operational efficiencies and uses less electricity as a result of certain arrangements of its components, as described in greater detail below.

Valve chamber 12 is substantially enclosed by an electrically powered coil 20a. When electricity is applied to coil 20a, it generates a magnetic flux. A pole piece 22a is arranged in valve chamber 12 and includes a metal surface 23a. Pole piece 22a is a magnetic component that is made from, for example, steel. An armature 24a is arranged in valve chamber 12 and has a first end 26a nearest the magnetic pole piece 22a. Armature 24a also has a second end 28a. First end 26a of armature 24a has a metal surface 30a, and second end 28a of armature 24a has a first sealing surface 32a and a second sealing surface 34a. In one embodiment, first sealing surface 32a comprises a rubber o-ring encircling armature 24a. In one embodiment, second sealing surface 34a comprises a rubber cap positioned at the second end 28a of armature 24a. Second valve chamber 14 has components corresponding those described herein for first valve chamber 12, as illustrated in FIG. 1.

Pulsator 10 further comprises a first input port 40a coupled to a filtered atmospheric air line and a second input port 42 coupled to a vacuum line. An air chamber 50a is positioned at one end of the valve chamber 12 and is operable to receive vacuum pressure from the second input port 42 in a first mode of operation described in greater detail below. Air chamber 50a is further operable to receive atmospheric air pressure from the first input port 40a when operating in a second mode of operation, as described in greater detail below. An output port 44a (illustrated in FIGS. 3-6) is coupled to the air chamber 50a and is operable to output atmospheric air pressure or vacuum pressure based on the mode of operation. Air chambers 50a and 50b are the parts of the pulsator 10 where either vacuum pressure or atmospheric pressure passes from either the vacuum port 42 or the atmospheric air ports 40*a* or 40*b*, respectively, to output ports 44*a* and 44*b* (illustrated in FIG. 3-6).

Input port 40*b* may be coupled to a filtered atmospheric air line. A second air chamber 50*b* is positioned at one end of second valve chamber 14 and is operable to receive either vacuum pressure from second input port 42 in a first mode of operation, or receive atmospheric air pressure from input port 40*b* in a second mode of operation. An output port 44*b* (illustrated in FIGS. 3-6) is coupled to the second air chamber 50*b* and is operable to output atmospheric air pressure or vacuum pressure based on the mode of operation.

Pulsator 10 includes a base structure 70 and a cover structure 80. Second input port 42 and output ports 44*a* and 44*b* are formed in base structure 70. Input ports 40*a* and 40*b* are formed in cover structure 80. Base structure 70 includes a base lip 72 formed along a perimeter of base structure 70. Cover structure 80 includes a cover lip 82 that runs along a perimeter of the cover structure 80. Cover lip 82 mates with base lip 72 by overhanging and partially extending around cover lip 72, as illustrated in FIG. 1. In one embodiment, this mating arrangement between base lip 72 and cover lip 82 creates a substantially drip proof interface which keeps moisture, dirt, and other adverse elements away from the interior of pulsator 10.

Base structure 70 includes an air baffle 90 that at least partially separates first air chamber 50*a* from second air chamber 50*b*. By separating air chamber 50*a* from air chamber 50*b*, the pressure applied in air chamber 50*a* has less effect on the pressure applied in air chamber 50*b*, and vice versa.

Pulsator 10 further comprises a nut 92 and bolt 94 arranged between the first valve chamber 12 and the second valve chamber 14. Nut 92 and bolt 94 form an assembly that couples base structure 70 and cover structure 80.

In general, valve chambers 12 and 14 operate independently of each other. However, in a particular embodiment, first valve chamber 12 operates in the first mode of operation when the second valve chamber 14 operates in the second mode of operation. Furthermore, in this embodiment, the second valve chamber 14 operates in the first mode of operation when the first valve chamber 12 operates in the second mode of operation. Each valve chamber 12 and 14 can control the operation of at least one teat cup liner. In this way, therefore, one pulsator assembly 10 may be used for milking an animal with at least one teat being milked while another teat is being massaged.

The application of atmospheric pressure collapses the teat cup liner while the application of vacuum pressure releases the liner causing milk to be drawn out from the teats of a cow and flow through the tubing to the reservoir tanks. The alternating pulsation applied to the teat cup liner creates a more stable application of either atmospheric or vacuum pressure to the milking apparatus, and a more consistent flow of milk from the cow to the reservoir tanks. This leads to a better application of pressure to the teat cup liners to prevent slippage. This is also beneficial to the health of the cow, such as to avoid mastitis.

Each of the valve chambers 12 and 14 operates in two modes of operation. The first mode of operation will be described with respect to second valve chamber 14 in FIG. 1, and the second mode of operation will be described with respect to first valve chamber 12 in FIG. 1. Referring to second valve chamber 14, during the first mode of operation, electricity is applied to coil 20*b* which generates a magnetic flux. This magnetic flux causes armature 24*b* to move into a first position in valve chamber 14 in response to a magnetic attraction between the metal surface 23*b* of pole piece 22*b* and the metal surface 30*b* of armature 24*b*. As a result, first sealing surface 32*b* of armature 24*b* mates with chamfered surface 60*b* of air chamber 50*b*, thereby creating a seal in air chamber 50*b* to block the atmospheric air pressure being applied at input port 40*b*. As a result, the vacuum pressure being applied at input port 42 flows through passage ways of base 70 and is output via output port 44*b*.

Referring to valve chamber 12*a*, during a second mode of operation, coil 20*a* is deactivated such that no magnetic flux is generated around valve chamber 12*a*. As a result, armature 24*a* moves into a second position in valve chamber 12*a*. This may be caused by gravity, or any other suitable force. When armature 24*a* is moved into the second position, second sealing surface 34*a* of armature 24*a* creates a seal in the air chamber 50*a* to block the vacuum pressure being applied at input port 42. As a result, the atmospheric air pressure being applied at input port 40*a* moves through the valve chamber 12*a* and the air chamber 50*a* such that it may be output from output port 44*a*.

Referring generally to pulsator 10, by arranging both the sealing surfaces 32 and 34 on second end 28 of an armature 24, the gap between the metal surface 23 of a pole piece 22 and the metal surface 30 of an armature 24 is reduced. This creates a more efficient metal-to-metal surface area relationship between pole piece 22 and armature 24. Prior pulsator assemblies used a sealing surface formed at first end 26 of armature 24 which increased the gap between the metal surface 23 of pole piece 22 and the metal surface 30 of armature 24. Because of the larger gap between metal surfaces, the magnetic flux required to attract armature 24 to pole piece 22 needed to be increased. In order to increase this magnetic flux, the coil 20 required the use of more electricity to generate more current. Sometimes, it also required more copper be used in the coil 20 thereby making it more expensive. The use of more electricity to operate these prior pulsators created more heat, reduced the operational efficiencies, and reduced the durability of the pulsator. Thus, the design of pulsator 10 having armature 24 with both sealing surfaces 32 and 34 at second end 28 leads to a more efficient magnetic flux circuit and operation.

Figure 2A:
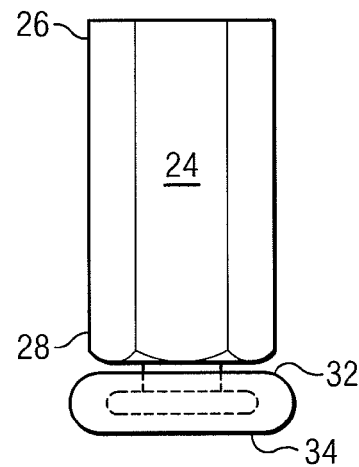
FIGS. 2A-2B illustrate an alternative embodiment of an armature for use in the pulsator of FIG. 1.
Figure 2B:
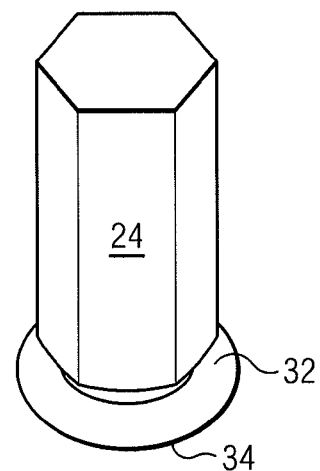

FIG. 2A illustrates a view of an alternative design for armature 24 having a single piece construction for sealing surfaces 32 and 34 at second end 28 of armature 24. In a particular embodiment, the single part having both sealing surfaces 32 and 34 is made of rubber. In operation, when this alternative embodiment of armature 24 is used in pulsator 10, sealing surface 32 creates a seal in air chamber 50 when armature 24 is positioned in the first mode of operation; and second surface 34 creates a seal in air chamber 50 when armature 24 is positioned in the second mode of operation. FIG. 2B illustrates a perspective view of the alternative design of armature 24 with sealing surfaces 32 and 34.

Figure 3:
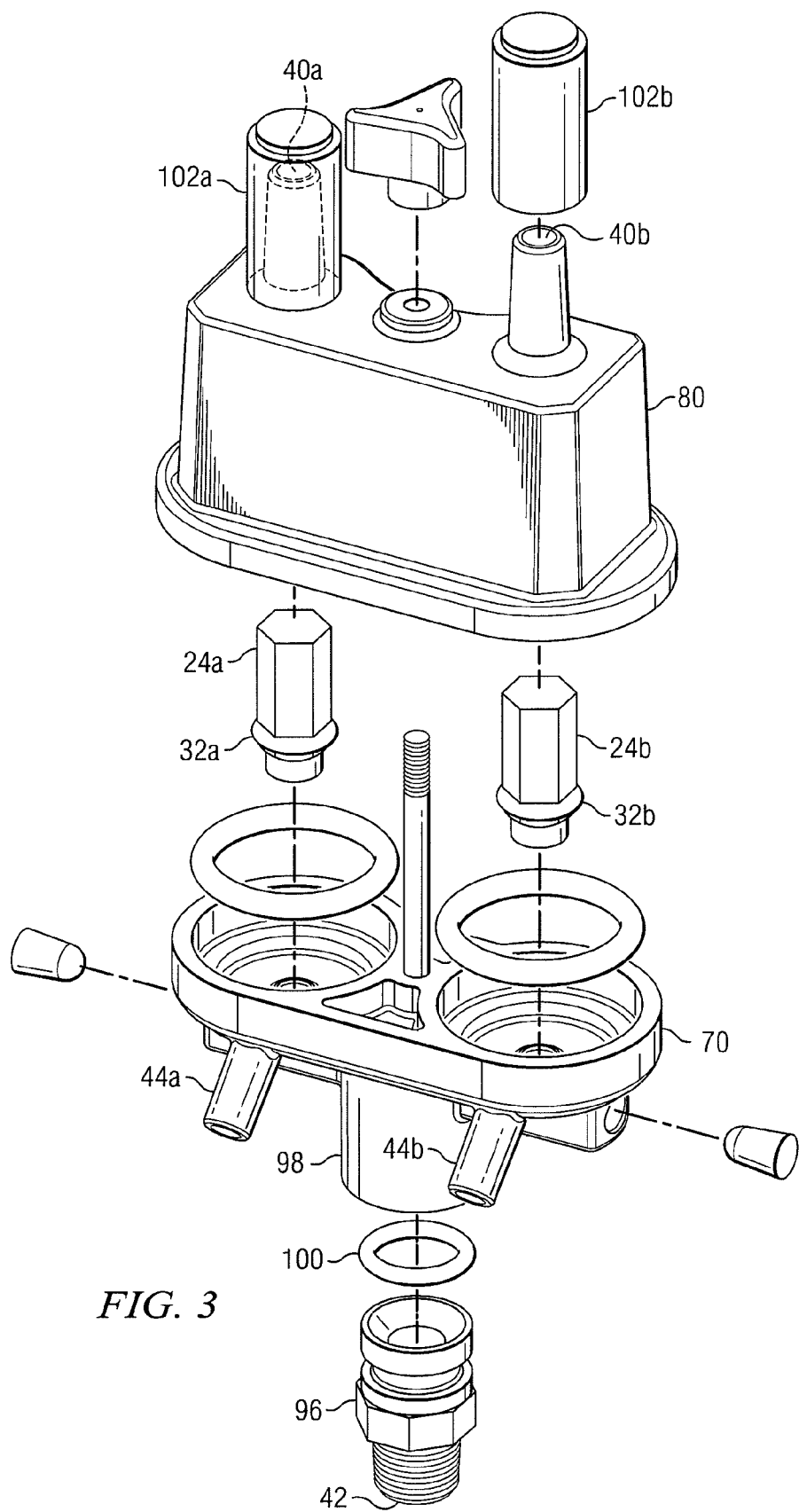
FIG. 3 illustrates one embodiment of an exploded perspective view of the pulsator of FIG. 1.

FIG. 3 illustrates one embodiment of an exploded perspective view of pulsator 10. The various components of pulsator 10 described above with regard to FIG. 1 are illustrated, as appropriate, such as cover structure 80 and base structure 70. Also illustrated are armatures 24*a* and 24*b*, first sealing surfaces 32*a* and 32*b*, input ports 40*a*, 40*b*, and 42, and output ports 44*a* and 44*b*.

As can be seen in FIG. 3, input port 42 includes a mating feature 96. Moreover, base 70 has a mating feature 98. Mating features 96 and 98 are shaped appropriately such that the orientation of component 96 is locked with respect to feature 98. For example, in one embodiment, the outside surface of mating feature 96 has an 8-sided polygon shape that mates to an 8-sided polygon shape on the inside of mating feature 98, and keeps the orientation of feature 96 locked relative to feature 98. In this regard, input port 42 cannot freely rotate within base 70 and is less likely to become disoriented or dislodged. In addition, an o-ring 100 is used to provide a vacuum tight seal between mating feature 96 and 98. In one embodiment, o-ring 100 comprises rubber. This allows for the more efficient application of vacuum pressure using pulsator 10.

Input ports 40a and 40b comprise tubulations which allow connection to a filtered atmospheric air line. Ports 40a and 40b are molded as part of the cover structure 80. Input ports 40a and 40b can either have a hose slipped over it that is connected to a filtered pipe, or a foam filter 102a and 102b may be placed around the input ports 40a and 40b in order to keep dirt and other adverse elements out of the valve chambers 12a and 12b. In one embodiment, the filtered pipe allows many separate pulsators 10 to share a large filter, which aids in maintenance.

Figure 4:
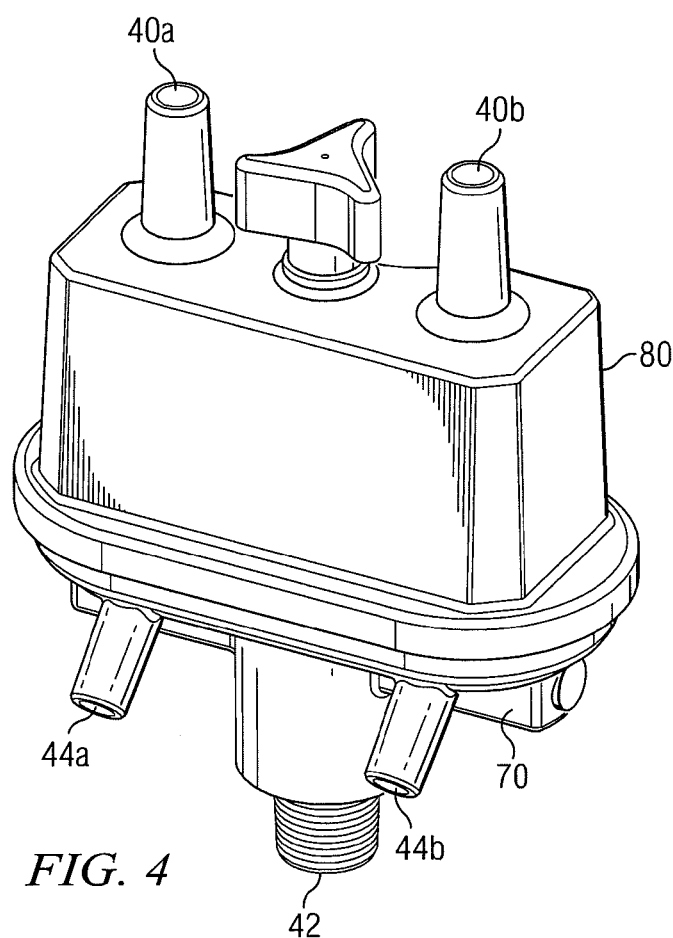
FIG. 4 illustrates one embodiment of an assembled perspective view of the pulsator of FIG. 1.

FIG. 4 illustrates one embodiment of an assembled perspective view of pulsator 10. Here, cover structure 80, base structure 70, input ports 40 and 42, and output ports 44 are visible.

Figure 5:
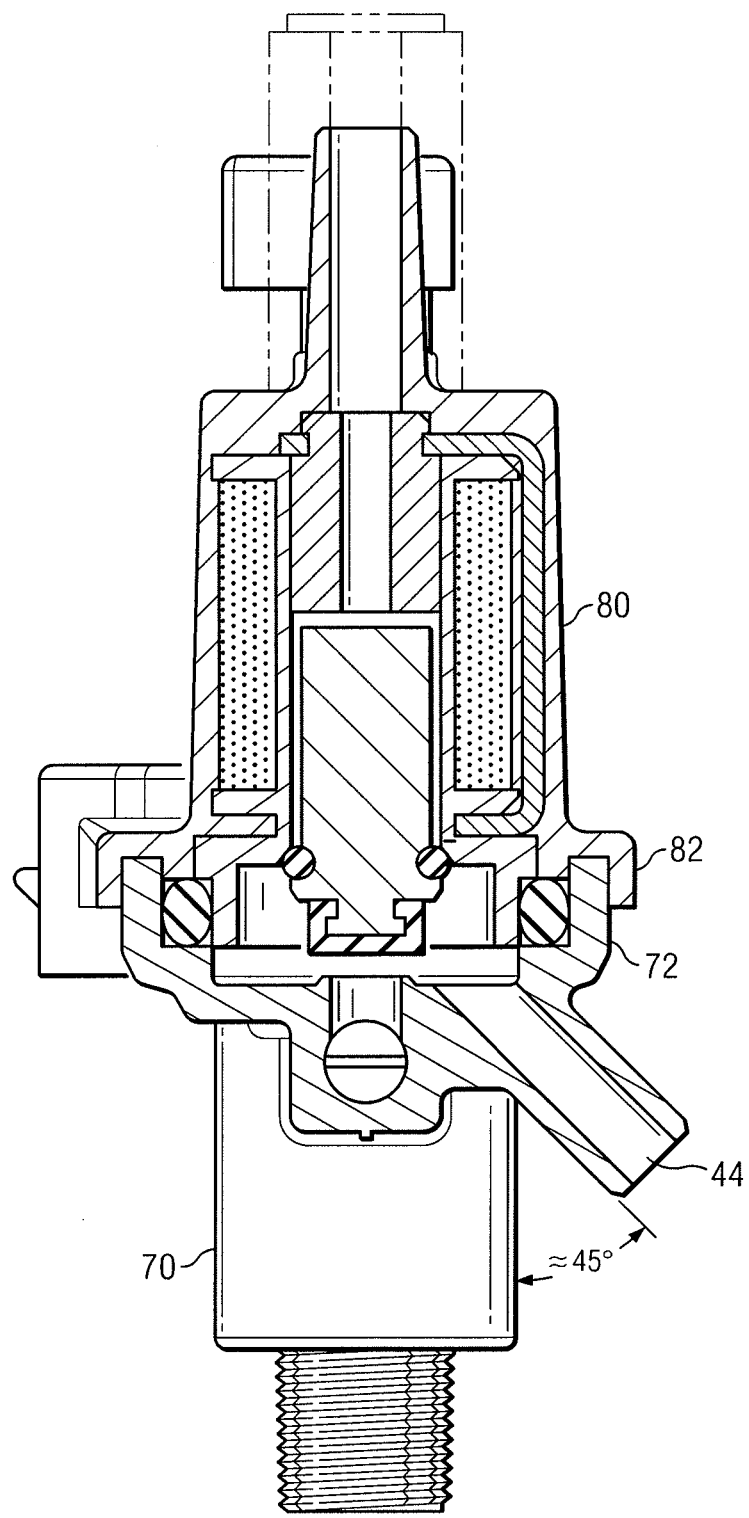
FIG. 5 illustrates one embodiment of a cutaway profile view of the pulsator of FIG. 1.

FIG. 5 illustrates one embodiment of a cutaway profile view of pulsator 10. This view illustrates cover structure 80 and base structure 70. Cover lip 82 is shown to overhang base lip 72, to create a substantially drip proof mating arrangement. In this embodiment, output port 44 is arranged at approximately a forty-five degree angle to base structure 70. This arrangement of output port 44 allows for ease of assembly with tubes and other milking equipment. In past designs, where output ports were arranged either vertically or horizontally in relation to a base component, the tubes extending from the output ports would need to be bent in different directions to couple them with the rest of the milking equipment. This created bends and restricted air flow. Furthermore, condensation accumulated in the bends of the tubes which created further restrictions. By arranging the output ports 44 at an approximately forty-five degree angle to the base structure 70, the airflow in the tubes flushes the condensation out of the tubes thereby removing restrictions and increasing the airflow.

Figure 6:
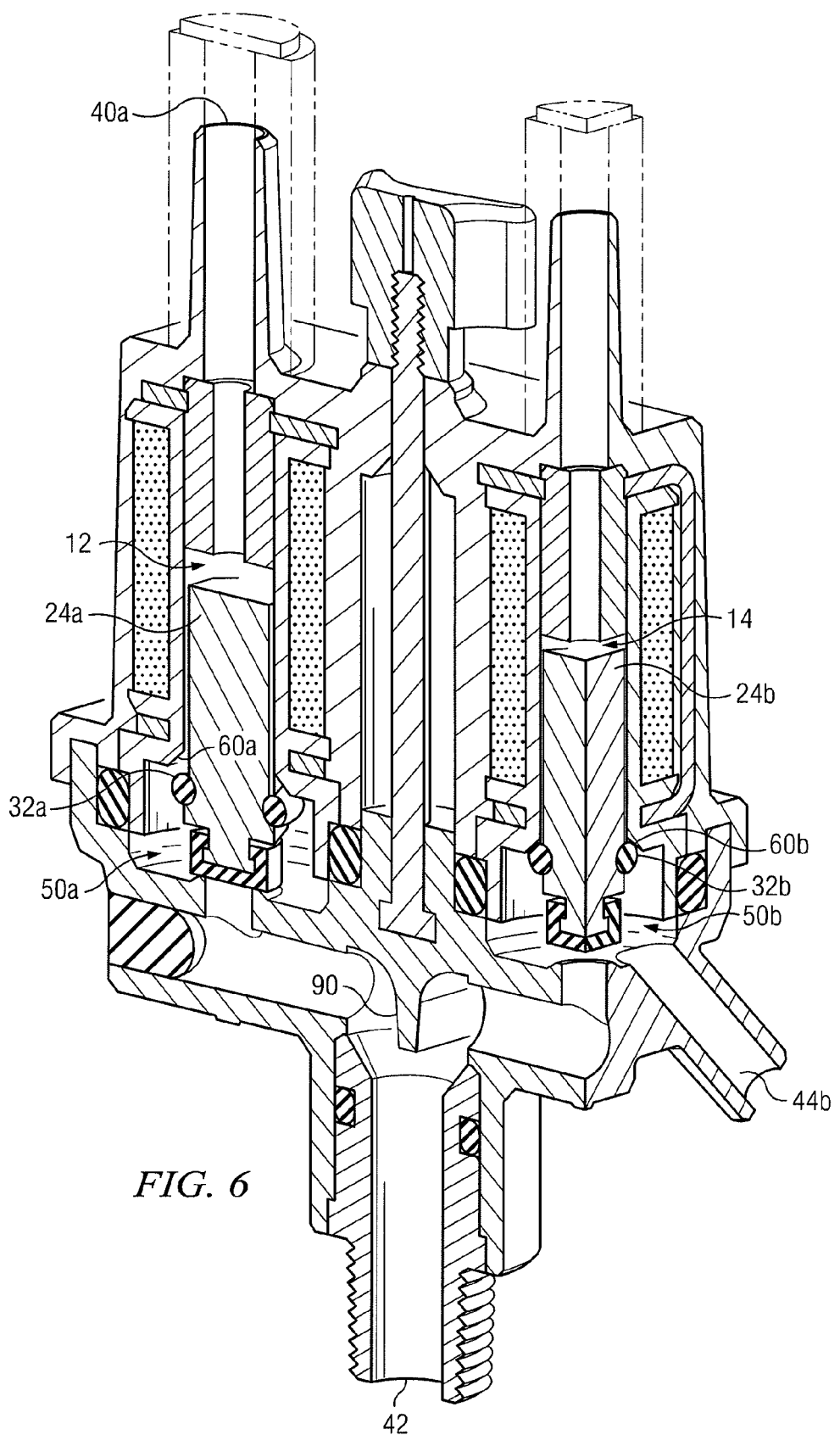
FIG. 6 illustrates one embodiment of a cutaway perspective view of the pulsator of FIG. 1.

FIG. 6 illustrates a cutaway perspective view of pulsator 10. This view of pulsator 10 illustrates armature 24a positioned in the second mode of operation and armature 24b positioned in a first mode of operation. Thus, atmospheric air pressure moves from input port 40a through air chamber 50a and out via output port 44a. Furthermore, vacuum pressure moves through input port 42 into air chamber 50b and out through output port 44b. Air baffle 90 separates air chamber 50a from 50b so that the pressure in air chamber 50a does not directly affect the air pressure in air chamber 50b.

Although the example embodiments have been described in detail, it should be understood that various changes, substitutions, and alterations can be made hereto without departing from the scope of the disclosure as defined by the appended claims.

What is claimed is:

1. A pulsator, comprising:
a first valve chamber;
a first electrically powered coil at least partially surrounding the first valve chamber and operable to generate a first magnetic flux;
a first magnetic pole piece arranged in the valve chamber and having a metal surface;
a first armature arranged in the valve chamber and having a first end nearest the magnetic pole piece and a second end, wherein the first end of the first armature has a metal surface and the second end has a first sealing surface and a second sealing surface, wherein the first sealing surface of the first armature is a separate component from the second sealing surface of the first armature;
a first input port configured to admit atmospheric air to the first valve chamber;
a second valve chamber;
a second electrically powered coil at least partially surrounding the second valve chamber and operable to generate a second magnetic flux;
a second magnetic pole piece arranged in the second valve chamber and having a metal surface;
a second armature arranged in the second valve chamber and having a first end nearest the second magnetic pole piece and a second end, wherein the first end of the second armature has a metal surface and the second end has a first sealing surface and a second sealing surface;
a second input port configured to admit atmospheric air to the second valve chamber; and
a third input port coupled to a vacuum line.

2. The pulsator of claim 1, further comprising:
a first input port admitting atmospheric air;
a second input port coupled to a vacuum line;
a first air chamber at one end of the first valve chamber and operable to receive vacuum pressure from the third input port in a first mode of operation and operable to receive atmospheric air pressure from the first input port in a second mode of operation; and
a first output port coupled to the first air chamber and operable to output atmospheric air pressure or vacuum pressure based on the mode of operation.

3. The pulsator of claim 2, wherein:
in the first mode of operation, the first coil activates to generate a first magnetic flux which causes the first armature to move into a first position in the first valve chamber in response to a magnetic attraction between the metal surface of the first pole piece and the metal surface of the first armature, wherein the first sealing surface of the first armature creates a seal in the first air chamber to block the atmospheric air admitted by the first input port; and
in a second mode of operation, the first coil deactivates such that the first armature moves into a second position in the first valve chamber, wherein the second sealing surface of the first armature creates a seal in the first air chamber to block the vacuum pressure from the third input port.

4. The pulsator of claim 3, wherein the first sealing surface of the first armature creates the seal with a chamfered surface of the first air chamber in the first mode of operation.

5. The pulsator of claim 2, further comprising:
a base structure that includes the third input port and the first output port; and
a cover structure that includes the first input port.

6. The pulsator of claim 5, wherein the first output port is arranged at an approximately forty-five degree angle to the base.

7. The pulsator of claim 6, wherein:
the base structure comprises a base lip along a perimeter of the base structure; and
the cover structure comprises a cover lip along a perimeter of the cover structure, the cover lip mating with the base lip by overhanging and partially extending around the cover lip.

8. The pulsator of claim 2, wherein the third input port comprises a first mating feature and the base structure comprises a second mating feature, wherein the first and second mating feature are shaped such that the orientation of the first mating feature is locked with respect to the second mating feature.

9. The pulsator of claim 1, wherein the first sealing surface of the first armature comprises a rubber o-ring encircling the first armature.

10. The pulsator of claim 1, wherein the second sealing surface of the first armature comprises a rubber cap positioned at the second end of the first armature.

11. The pulsator of claim 1, further comprising:
a second air chamber at one end of the second valve chamber and operable to receive vacuum pressure from the third input port in a first mode of operation of the second valve chamber and operable to receive atmospheric air pressure from the second input port in a second mode of operation of the second valve chamber; and
a second output port coupled to the second air chamber and operable to output atmospheric air pressure or vacuum pressure based on the mode of operation of the second valve chamber.

12. The pulsator of claim 11, wherein:
in the first mode of operation of the second valve chamber, the second coil activates to generate a second magnetic flux which causes the second armature to move into a first position in the second valve chamber in response to a magnetic attraction between the metal surface of the second pole piece and the metal surface of the second armature, wherein the first sealing surface of the second armature creates a seal in the second air chamber to block the atmospheric air admitted by the second input port; and
in a second mode of operation of the second valve chamber, the second coil deactivates such that the second armature moves into a second position in the second valve chamber, wherein the second sealing surface of the second armature creates a seal in the second air chamber to block the vacuum pressure from the third input port.

13. The pulsator of claim 11, wherein the first valve chamber and the second valve chamber operate independently and generally alternately with each other with some overlap in operation.

14. The pulsator of claim 1, wherein the first valve chamber and the second valve chamber reside in a common housing that includes a base structure and a cover structure.

15. The pulsator of claim 14, further comprising a single nut and bolt assembly arranged between the first valve chamber and the second valve chamber and that couples the base structure and the cover structure.

16. The pulsator of claim 1, further comprising an air baffle to at least partially separate the first air chamber from the second air chamber.

17. A pulsator, comprising:
a valve chamber;
an electrically powered coil at least partially surrounding the valve chamber and operable to generate a magnetic flux;
a magnetic pole piece arranged in the valve chamber and having a metal surface; and
an armature arranged in the valve chamber and having a first end nearest the magnetic pole piece and a second end, wherein the first end of the armature has a metal surface and the second end has a first sealing surface and a second sealing surface, wherein the first sealing surface of the armature is a separate component from the second sealing surface of the armature;
wherein:
in a first mode of operation, the coil activates to generate a magnetic flux which causes the armature to move into a first position in the valve chamber in response to a magnetic attraction between the metal surface of the pole piece and the metal surface of the armature, wherein the first sealing surface of the armature creates a seal; and
in a second mode of operation, the coil deactivates such that the armature moves into a second position in the valve chamber, wherein the second sealing surface of the armature creates a seal.

18. The pulsator of claim 17, further comprising:
a first input port admitting atmospheric air;
a second input port coupled to a vacuum line;
an air chamber at one end of the valve chamber and operable to receive vacuum pressure from the second input port in the first mode of operation and operable to receive atmospheric air pressure from the first input port in the second mode of operation; and
an output port coupled to the air chamber and operable to output atmospheric air pressure or vacuum pressure based on the mode of operation.

* * * * *